United States Patent [19]

Matsuda

[11] Patent Number: 5,684,557
[45] Date of Patent: Nov. 4, 1997

[54] APPARATUS FOR MINIMIZING AND DISCHARGING ELECTROSTATIC CHARGES ON A SURFACE OF AN LCD PANEL OR ELECTRONIC PART

[75] Inventor: Akehiro Matsuda, Tokyo, Japan

[73] Assignee: NEC Corporation, Tokyo, Japan

[21] Appl. No.: 543,107

[22] Filed: Oct. 13, 1995

[30] Foreign Application Priority Data

Oct. 13, 1994 [JP] Japan ................................. 6-273130

[51] Int. Cl.⁶ ........................... G02F 1/13; B23P 19/00; B29C 65/00; B23B 5/22
[52] U.S. Cl. ........................ 349/187; 29/743; 156/285; 279/3
[58] Field of Search ......................... 359/62, 63, 82; 279/3; 156/285; 414/937, 939; 29/743, DIG. 78; 349/187

[56] References Cited

U.S. PATENT DOCUMENTS 4,923,552  5/1990  Fukushima et al. .................. 156/285
5,191,218  3/1993  Mori et al. .......................... 279/3

FOREIGN PATENT DOCUMENTS 6-102505  4/1994  Japan .

OTHER PUBLICATIONS

"Applying Polarizers to Liquid Crystal Displays", Xerox Technical Journal, vol. 9, No. 4, pp. 259–260 Jul. 1984.

*Primary Examiner*—William L. Sikes
*Assistant Examiner*—Walter J. Malinowski
*Attorney, Agent, or Firm*—Sughrue, Mion, Zinn, Macpeak & Seas, PLLC

[57] ABSTRACT

In an apparatus for adhering a polarizer to an LCD (Liquid Crystal Display) panel, a set plate for holding the panel thereon by suction is formed with a plurality of channels on the surface thereof. A discharge bar adjoins the set plate and blows air under pressure into the channels. When the panel is laid on or separated from the set plate, the air dissipates static electricity. This reduces electrostatic charge deposited on the panel and thereby reduces the electrostatic breakdown of the panel.

6 Claims, 5 Drawing Sheets

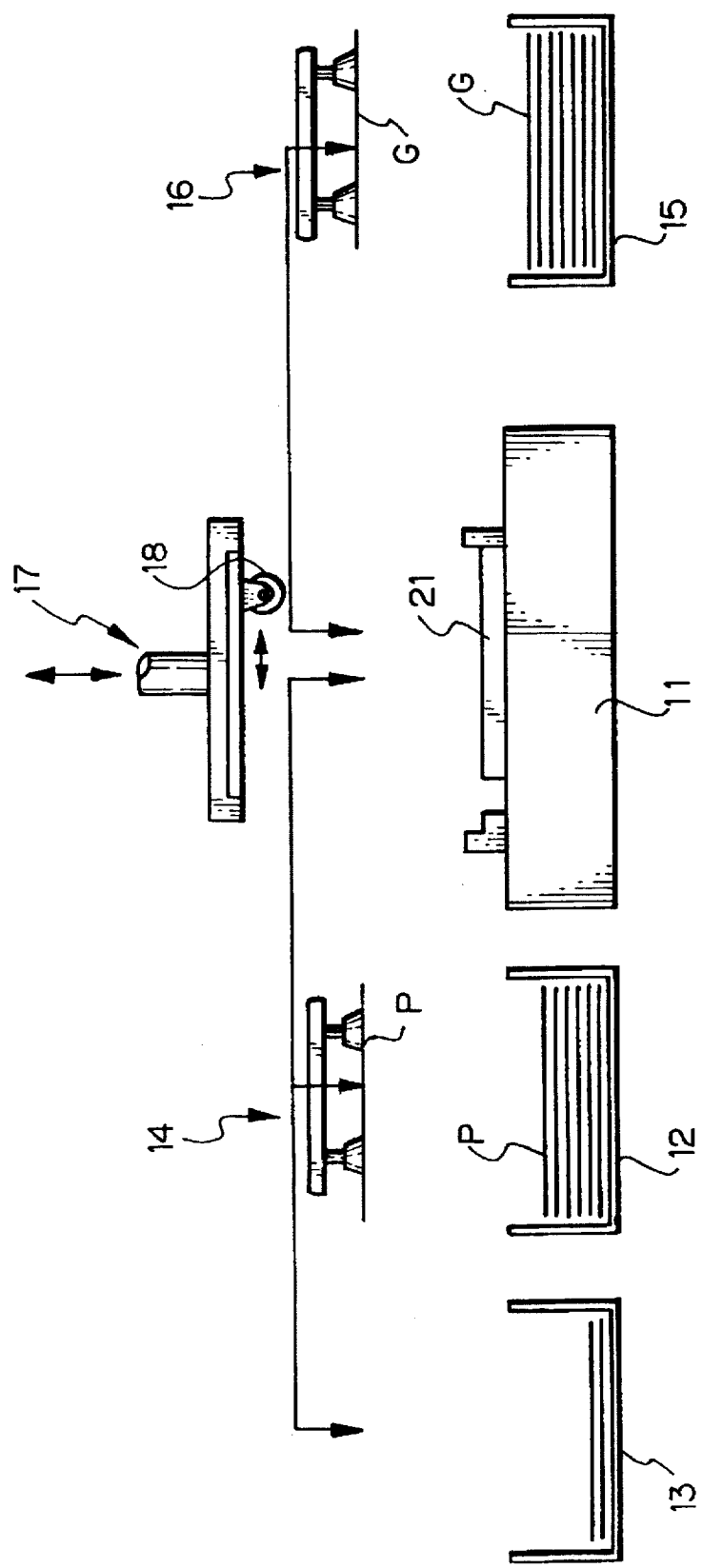

APPARATUS FOR MINIMIZING AND DISCHARGING ELECTROSTATIC CHARGES ON A SURFACE OF AN LCD PANEL OR ELECTRONIC PART

BACKGROUND OF THE INVENTION

The present invention relates to an apparatus for adhering a polarizer to a liquid crystal display (LCD) panel and, more particularly, to an improvement in a set plate included in the apparatus for supporting the LCD panel during the course of adhesion.

It is a common practice with an LCD device to adhere a polarizer to the surface of an LCD panel having a liquid crystal layer. An apparatus for adhering a polarizer to an LCD panel has been proposed in various forms in the past, including one by the present applications. However, the conventional apparatuses are not satisfactory in the following respects. When a polarizer is adhered to an LCD panel, static electricity is generated by friction and deposits electrostatic charge on the panel. Moreover, the electrostatic charge is rapidly discharged and brings about the electrostatic breakdown of thin-film transistors (TFT) arranged on the panel and having a MOS (Metal Oxide Semiconductor) configuration.

SUMMARY OF THE INVENTION

It is, therefore, an object of the present invention to provide a polarizer adhering apparatus capable of effectively dissipating electrostatic charge to deposit on an LCD panel and thereby protecting the panel from electrostatic breakdown.

It is another object of the present invention to provide a polarizer adhering apparatus capable of obviating the rapid discharge of electrostatic charge deposited on an LCD panel and thereby freeing the panel from electrostatic breakdown.

An apparatus for adhering a polarizer to the surface of an LCD panel of the present invention comprises a set plate formed with a plurality of channels on the surface thereof, for holding the panel on the surface by sucking the panel with vacuum, and with a discharge bar positioned in the vicinity of the set plate, for blowing air under pressure into the plurality of channels.

BRIEF DESCRIPTION OF THE DRAWINGS

The above and other objects, features and advantages of the present invention will become more apparent from the following detailed description taken with the accompanying drawings in which:

FIG. 1 shows the general construction of a polarizer adhering apparatus according to the present invention

DESCRIPTION OF THE PREFERRED EMBODIMENTS

Figure 2A:
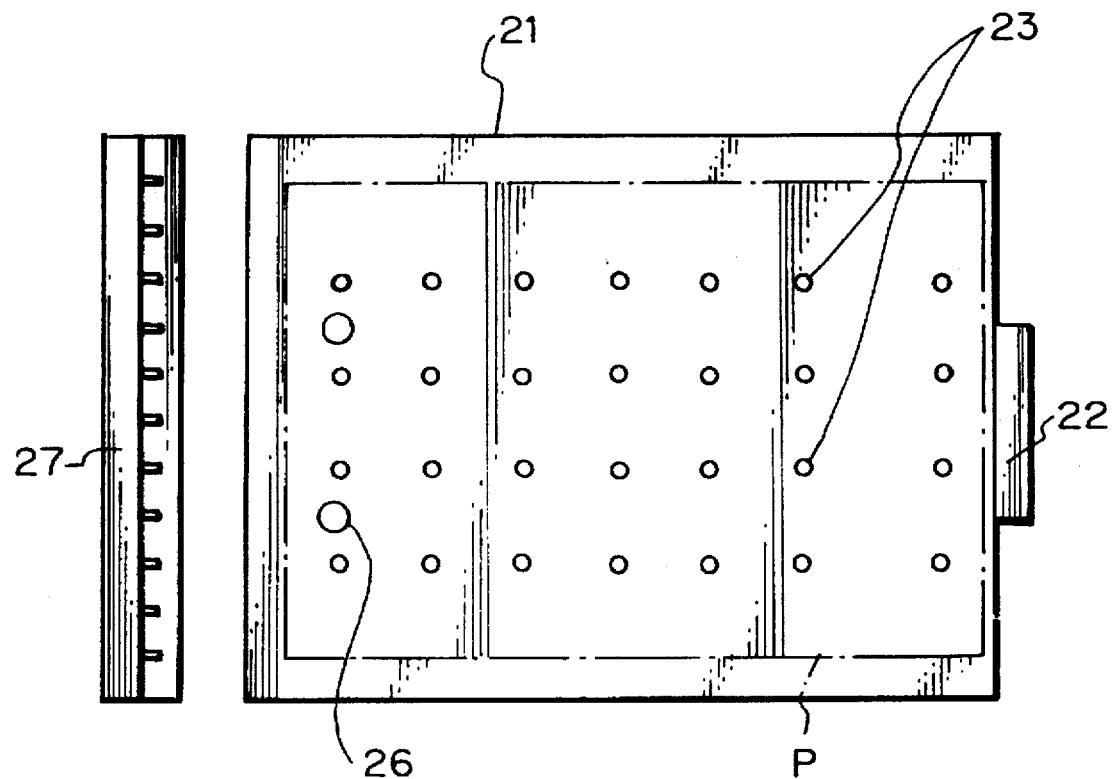
FIG. 2A is a plan view of a set plate included in the apparatus of FIG. 1.

Referring to FIG. 1 of the drawings, a polarizer adhering apparatus for an LCD panel and which I have proposed is shown. As shown, the apparatus has a table 11. A feed cassette 12 and a collection cassette 13 are located at one side of the table 11. The feed cassette 12 is loaded with a stack of LCD panels P to which polarizers G will be adhered, while the collection cassette 12 is used to collect the LCD panels P to which the polarizers G have been adhered. A panel conveyor 14 is movable in a reciprocating motion between the cassettes 12 and 13 and the table 11. A polarizer cassette 15 is located at the other side of the table 11 and loaded with the polarizers G. A polarizer conveyor 16 is movable in a reciprocating motion between the cassette 15 and the table 11. An adhering unit 17 is disposed above the table 11 and movable up and down. The adhering unit 17 has a roller 18.

In operation, the panel conveyor 14 picks up the top LCD panel P from the cassette 12 by vacuum, conveys it to the table 11, and then positions it on the table 11. The polarizer conveyor 16 picks up the top polarizer G from the cassette 15 by vacuum, conveys it to the table 11, and then lays it on the LCD panel P. After the adhering unit 17 has been lowered onto the polarizer G positioned on the table 11, the roller 18 is caused to roll on the polarizer G for thereby adhering the polarizer G to the LCD panel P with adhesive. The LCD panel P with the polarizer G is transported to and collected in the cassette 13 by the panel conveyor 14.

Figure 2B:
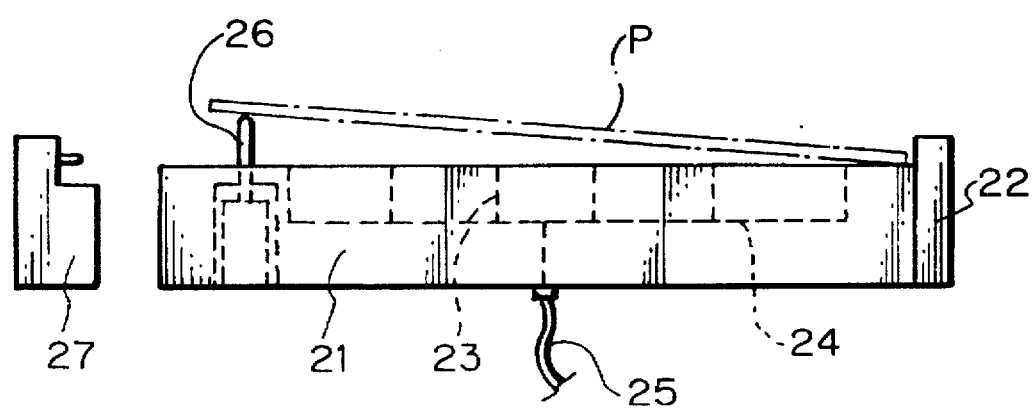
FIG. 2B is a front view of the set plate.

The prerequisite with the above adhering apparatus is that the LCD panel P be accurately positioned on the table 11 and stably held thereon until the polarizer G has been fully adhered to the panel P. FIGS. 2A and 2B show a set plate 21 which is have proposed in order to meet the prerequisite. As shown, the set plate 21 is implemented as a thick plate. A position plate 22 is formed integrally with and located at one edge of the set plate 21 in order to position the LCD panel P, as will be described later specifically. A number of suction holes 23 are formed in the surface of the set plate 21 and fluidly communicated to a vacuum source, not shown, by passageways 24 and a tube 25. A plurality of pressure pins 26 are provided on the set plate 21 at the side opposite to the position plate 22. The pressure pins 26 are each capable of protruding upward by being actuated by a vacuum plunger or an electromagnetic plunger, not shown. A discharge bar 27 is positioned in the vicinity of the side of the set plate 21 where the pressure pins 26 are arranged. The discharge bar 27 is capable of blowing air under pressure for dissipating static electricity or electrostatic charge.

The operation of the set plate 21 is as follows. The LCD panel P brought to the set plate 21 is positioned by having its one edge abutted against the position plate 22, and then laid on the set plate 21. In this condition, the vacuum source is operated to suck the panel P onto the set plate 21 via the suction holes 23. After the polarizer G, FIG. 1 has been adhered to the panel P by the previously stated procedure, the vacuum is cancelled. At the same time, the pressure pins 26 are jutted out to separate the panel P from the set plate 21. Then, the panel conveyor 14 conveys the panel P with the polarizer G to the cassette 13, FIG. 1. At this time, the discharge bar 27 blows air toward the panel P in order to dissipate charge electrostatically deposited thereon.

However, by actually adhering the polarizer G to the LCD panel P by use of the set plate 21, the above configuration had some problems yet to be solved, as follows. The LCD panel P contacts the set plate 21 over its entire lower surface. Hence, when the panel P is laid on or separated from the set plate 21, friction acts between the panel P and the set plate 21 over substantially the entire surface of the panel P. The friction generates static electricity and thereby charges the panel P. When the panel P is separated from the set plate 21 which is held at or substantially at the ground potential, the electrostatic charge is rapidly discharged. As a result, it is likely that TFTs arranged on the panel P and having a MOS transistor structure suffer from electrostatic breakdown.

Although the discharge bar 27 blows air under pressure toward the panel P, the air simply enters the gap between the panel P and the set plate 21 formed when the panel P is separated from the plate 21. Hence, the air begins dissipating the electrostatic charge only after the rapid discharge. It follows that the charge dissipating effect available with the discharge bar 27 is limited.

Moreover, when the panel P is laid onto the set plate 21, it is difficult blow air to between the panel P and the plate 21 with the discharge bar 27. This again fails to dissipate the resulting static electricity to an expected degree.

Figure 3:
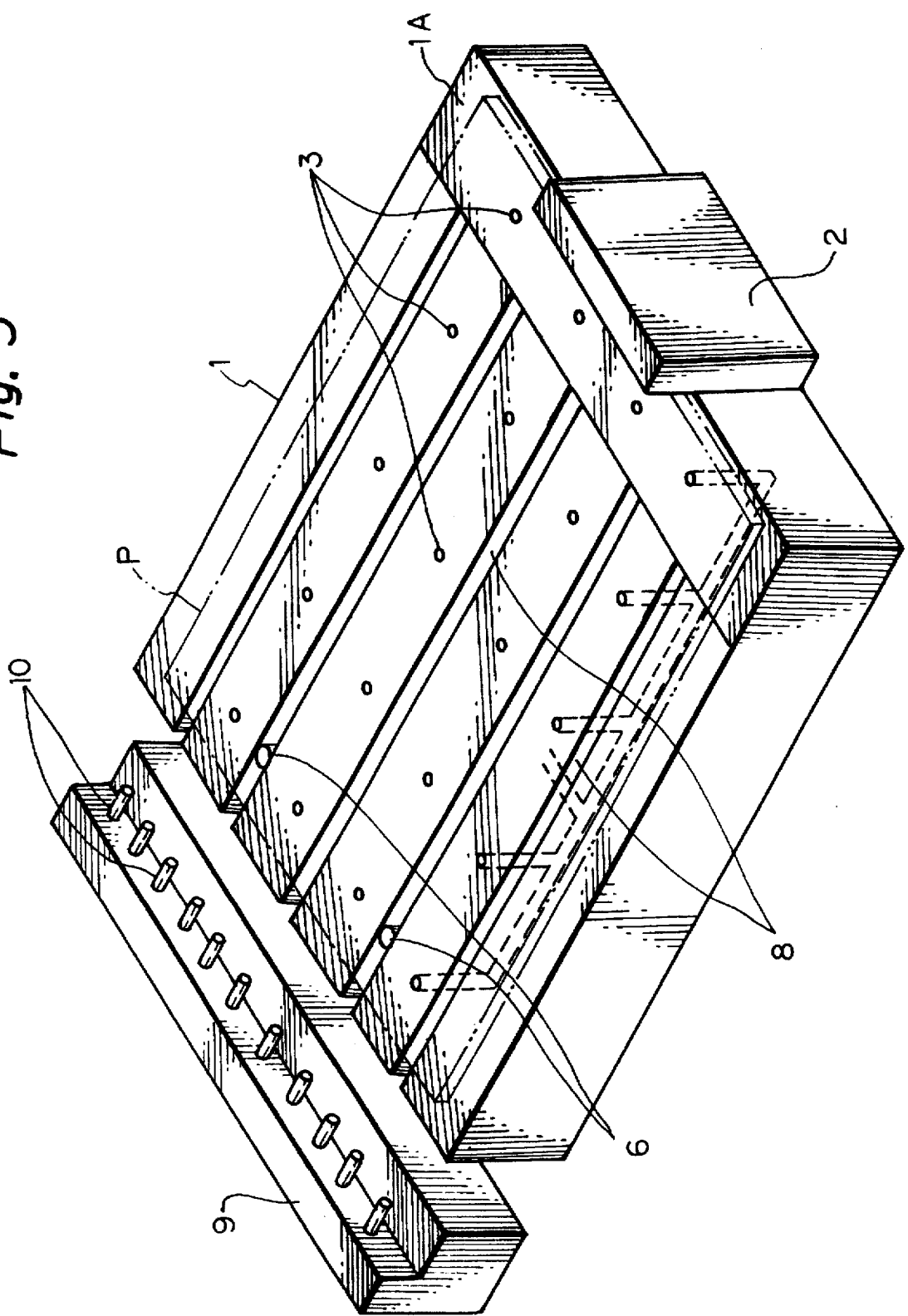
FIG. 3 is a perspective view of a set plate representative of an embodiment of the polarizer adhering apparatus in accordance with the present invention.
Figure 4A:
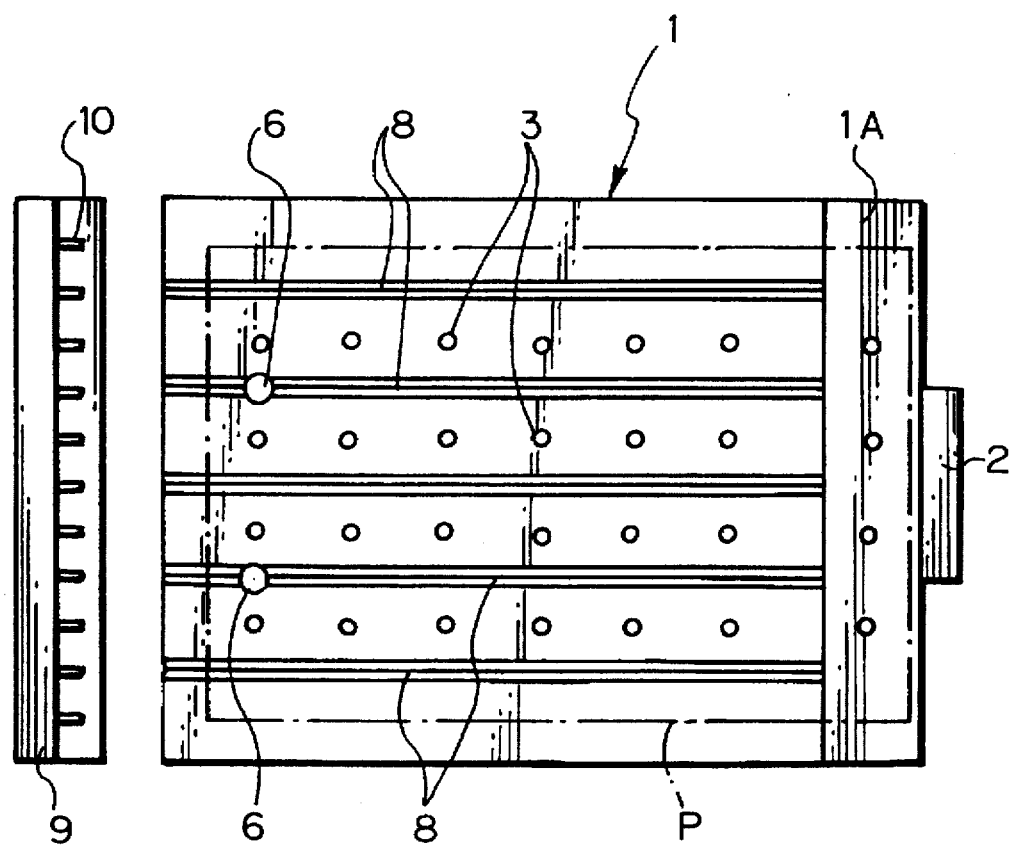
FIG. 4A is a plan view of the set plate shown in FIG. 3.
Figure 4B:
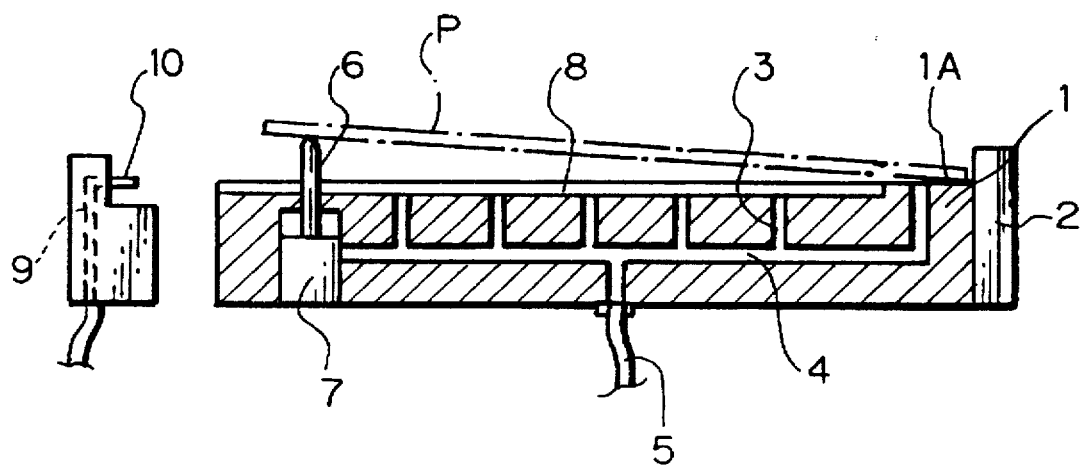
FIG. 4B is a front view of the set plate shown in FIG. 3.

Referring to FIGS. 3, 4A and 4B, a polarizer adhering apparatus embodying the present invention will be described. As shown, the embodiment is represented by a set plate 1 which is applicable also to the apparatus shown in FIG. 1. Assume that the set plate 1 is mounted on the table 11, FIG. 1, by way of example. The set plate 1, implemented as a thick plate, has a position plate 2 on one side thereof. The position plate 2 protrudes upward from the set plate 1 and serves to position the LCD panel P in the same manner as the position plate 22, FIGS. 2A and 2B. A number of suction holes 3 are formed in the surface of the set plate 1 in a matrix arrangement. The holes 3 are fluidly communicated to a vacuum source, not shown, via passageways 4 formed in the set plate 1 and a tube 5.

A plurality of (two in the embodiment) pressure pins 6 are provided on the other side of the set plate 1, and each is capable of protruding upward by being actuated by a vacuum plunger 7. A plurality of channels 8 each having a V-shaped cross-section extend in the right-and-left direction, as viewed in the figures, over the entire surface of the set plate 1 except for a narrow region 1A. Each channel 8 intervenes between the nearby arrays of the suction holes 3. The region 1A adjoins the position plate 2 and has a simple flat surface as distinguished from the surface with the channels 8. The pressure pins 6 are positioned in particular ones of the channels 8. A discharge bar 9 is located in the vicinity of and slightly spaced from the other side of the set plate 1. The discharge bar 9 has a plurality of nozzles 10 for blowing air under pressure. The nozzles 10 are respectively oriented toward the portions of the end of the set plate 1 where the channels 8 are open.

To adhere the polarizer G to the LCD panel P, the set plate 1 is operated in substantially the same manner as described with reference to FIG. 1, except for the following. After the panel P has been brought to a position just above the set plate 1 by the panel conveyor 14, the panel P is positioned by having its one edge abutted against the position plate 2. At this instant, in the lateral direction (up-and-down direction as viewed in FIG. 4A), the panel P is positioned when the panel conveyor 14 picks it up from the cassette 12, FIG. 1.

When the panel conveyor 14 lays the panel P on the set plate 1, the vacuum source starts sucking it onto the plate 1 via the tube 5 and passageways 4. At the same time, the discharge bar 9 starts blowing discharge air toward the set plate 1. The discharge air flows into the channels 8 of the set plate 1 and contacts the lower surface of the panel P. Hence, although the panel P is electrostatically charged due to friction between the panel P and the set plate 1, the air dissipates it at the portions of the panel P facing the channels 8. Further, the charge dissipation spreads to the entire surface of the panel P. This successfully protects TFTs and other elements arranged on the panel P from electrostatic breakdown.

The channels 8 reduce the total area over which the panel P and set plate 1 directly contact each other. However, the region 1A of the set plate 1 where the channels 8 are absent allows the panel P and set plate 1 to closely contact each other. The region 1A, therefore, prevents the suction acting on the panel P from being lowered by the channels 8.

After the polarizer G has been adhered to the upper surface of the panel P, the panel P is removed from the set plate 1 and conveyed toward the cassette 13, FIG. 1. At this instant, when the panel conveyor 14 sucks the panel P from the above, the vacuum plungers 7 are operated to jut out the pressure pins 6. As a result, the edge portion of the panel P remote from the region 1A are separated from the set plate 1. At the same time, the discharge bar 9 blows discharge air toward the set plate 1. The discharge air flows into the channels 8 between the panel P and the set plate 1 before the panel P is separated from the plate 1. Consequently, the discharge air immediately dissipates static electricity which may be generated by the friction between the panel P and the set plate 1. This prevents the panel P from being electrostatically charged.

Even if a part of the static electricity charges the panel P, the air continuously flowing through the channels 8 dissipates it immediately. In this manner, the panel P is protected from electrostatic breakdown when separated from the set plate 1.

In addition, the air flowing into the channels 8 promotes the separation of the panel P from the set plate 1 due to its pressure. As a result, the friction between the panel P and the set plate 1 is reduced and, in turn, reduces the generation of static electricity.

Figure 5A:
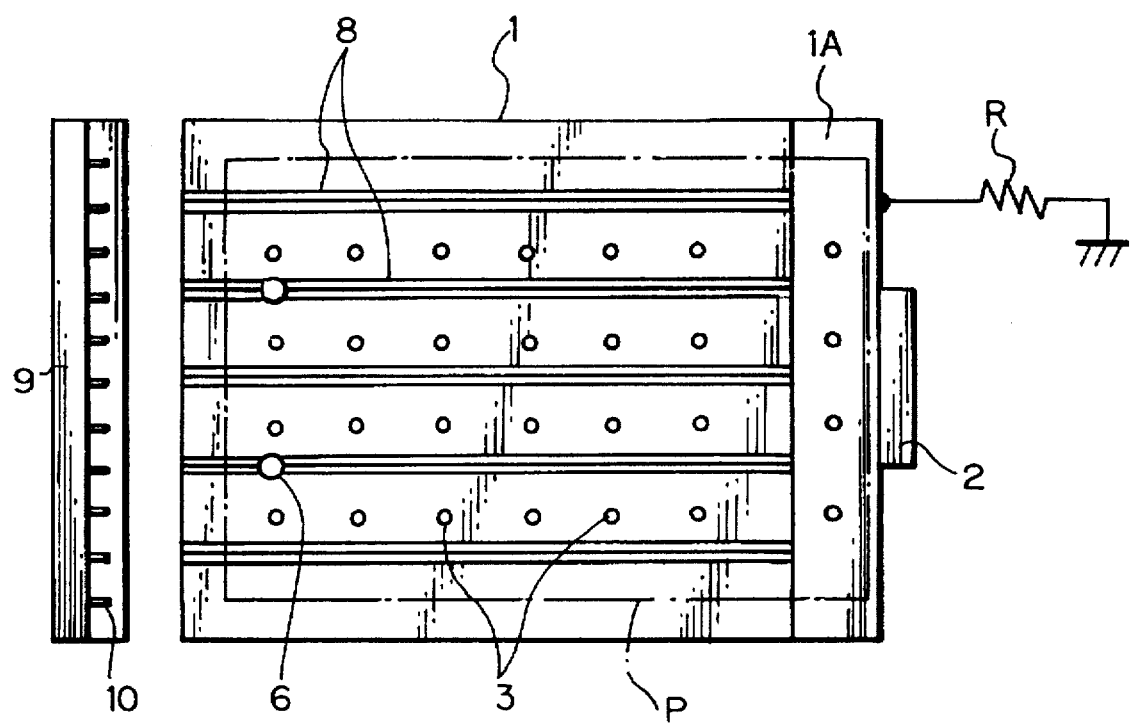
FIG. 5A is a front view showing an alternative embodiment of the present invention.
Figure 5B:
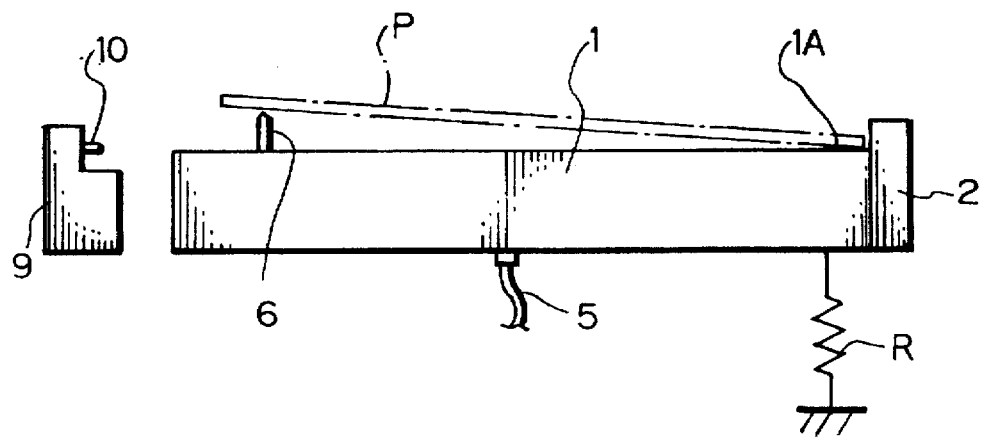
FIG. 5B is a front view of the alternative embodiment.

An alternative embodiment of the present invention will be described with reference to FIGS. 5A and 5B. This embodiment is essentially similar to the previous embodiment except that the upper surface of the set plate 1 is fully covered with an insulating film, not shown, and that the plate 1 is connected to ground via a resistor R having a high resistance. The configuration including the V-shaped channels and discharge bar 9 is exactly the same as in the previous embodiment.

The alternative embodiment, like the previous embodiment, is capable of reducing the electrostatic charge to deposit on the panel P due to the channels 8 and discharge air. Even if the panel P is electrostatically charged, the rapid discharge of the static electricity between the panel P and the set plate can be reduced because the plate 1 is connected to ground via the high resistance R. Consequently, the panel P suffers from a minimum of electrostatic breakdown. Ideally, the electrostatic charge deposited on the panel P is sequentially discharged via the resistor R, so that the rapid discharge and, therefore, the electrostatic breakdown of the panel P is practically obviated.

In the illustrative embodiments, the channels 8 may be provided with a semicircular, U-shaped or rectangular cross-section in place of the V-shaped cross section. Further, the channels 8 may be formed in a lattice configuration or a branch configuration. In addition, some of the nozzles of the discharge bar 9 may have their holes positioned in close proximity to the open ends of the channels 8 in order to introduce the discharge air efficiently into the channels 8.

In summary, it will be seen that the present invention provides a polarizer adhering apparatus having various unprecedented advantages as enumerated below.

(1) Air under pressure from a discharge bar is introduced into channels intervening between an LCD panel and a set plate. This air dissipates electrostatic charge from the panel over a broad area. Hence, when the panel is laid on or separated from the set plate, a minimum of electrostatic charge is allowed to deposit on the panel. The panel is, therefore, protected from electrostatic breakdown.

(2) The channels have little influence on vacuum sucking the panel via suction holes.

(3) The channels are absent in a part of the surface of the set plate. Hence, the suction acting on the panel is scarcely lowered despite the channels. This surely holds the panel on the set plate during the course of adhesion.

(4) The air under pressure is efficiently introduced into the channels and enhances the dissipation of the electrostatic charge from the panel.

(5) Even when electrostatic charge is deposited on the panel, it is prevented form being rapidly discharge. The panel is, therefore, free from electrostatic breakdown attributable to rapid discharge.

Various modifications will become possible for those skilled in the art after receiving the teachings of the present disclosure without departing from the scope thereof.

What is claimed is:

1. An apparatus for minimizing and discharging electrostatic charges on a surface of an LCD (Liquid Crystal Display) panel, comprising:

a set plate formed with a plurality of channels on a surface thereof, for reducing electrostatic charges between the LCD panel LCD and the set plate when they are in contact; and an electrostatic discharge bar positioned in a vicinity of said plate, for blowing air under pressure into said plurality to channels to dissipate electrostatic charges on the surface of the LCD panel on at least one of application and removal of the LCD panel from the set plate.

2. The apparatus as claimed in claim 1, wherein a number of suction holes are formed in said surface of said set plate, and wherein said plurality of channels each extends between nearby arrays of said suction holes.

3. The apparatus as claimed in claim 1, wherein said surface of said set plate includes a region where said plurality of channels are absent.

4. The apparatus as claimed in claim 1, wherein said plurality of channels have a V-shaped cross-section, extend in parallel to each other, and have open ends facing said discharge bar.

5. The apparatus as claimed in claim 1, wherein said surface of said set plate is covered with an insulating film, and wherein said set plate is connected to ground via a high resistance.

6. An apparatus for minimizing and discharging electrostatic charges on a surface of an electronic part, comprising:

a set plate formed with a plurality of channels on a surface thereof, for reducing electrostatic charges between the electronic part and the set plate when they are in contact; and an electrostatic discharge bar positioned in a vicinity of said set plate, for blowing air under pressure into said plurality of channels to dissipate the electrostatic charges on the surface of the electronic part on at least one of application and removal of the electronic part from the set plate.

* * * * *